United States Patent [19]
Tanahashi et al.

[11] Patent Number: 5,922,456
[45] Date of Patent: Jul. 13, 1999

[54] LONGITUDAL MAGNETIC RECORDING MEDIUM HAVING A MULTI-LAYERED UNDERLAYER AND MAGNETIC STORAGE APPARATUS USING SUCH MAGNETIC RECORDING MEDIUM

[75] Inventors: Kiwamu Tanahashi, Fujisawa; Yuzuru Hosoe, Hino; Ichiro Tamai; Tetsuya Kanbe, both of Yokohama; Tomoo Yamamoto, Nagaoka, all of Japan

[73] Assignee: Hitachi, Ltd., Tokyo, Japan

[21] Appl. No.: 08/922,277

[22] Filed: Sep. 3, 1997

[30] Foreign Application Priority Data

Sep. 4, 1996 [JP] Japan ................................. 8-233910

[51] Int. Cl.$^6$ ..................................................... G11B 5/66
[52] U.S. Cl. ..................... 428/332; 428/336; 428/694 T; 428/694 TS; 428/694 R; 428/900
[58] Field of Search .......................... 428/694 T, 694 TS, 428/694 R, 900, 694 ST, 336, 332

[56] References Cited

U.S. PATENT DOCUMENTS 5,605,733  2/1997  Ishikawa ................................. 428/65.3
5,693,426  12/1997  Lee ........................................... 428/611
5,738,927  4/1998  Nakamura ................................. 428/141

FOREIGN PATENT DOCUMENTS 0 704 839  4/1996  European Pat. Off. .
62-257618  11/1987  Japan .
63-137018  8/1988  Japan .

OTHER PUBLICATIONS

J. Appl. Phys., vol. 73(10), May 15, 1993, pp. 5566–5568.
Patent Abstracts of Japan, vol. 15, No. 349, Sep. 4, 1991, JP 3–132915 (Ricoh Co. Ltd.).
Patent Abstracts of Japan, vol. 14, No. 392, Aug. 23, 1990, JP 2–148439 (Canon Inc.).

*Primary Examiner*—Leszek Kiliman
*Attorney, Agent, or Firm*—Kenyon & Kenyon

[57] ABSTRACT

A longitudinal magnetic recording medium and a magnetic storage apparatus using the longitudinal magnetic recording medium. The recording medium has a multi-layered underlayer and a magnetic layer formed on it. The underlayer has a first layer of a body-centered cubic structure, a second layer of a hexagonal-close packed structure formed on the first layer, and a third layer of a bcc structure formed on the second layer. The underlayer may further have a fourth layer of an hcp structure layer formed on the third layer.

31 Claims, 5 Drawing Sheets

LONGITUDAL MAGNETIC RECORDING MEDIUM HAVING A MULTI-LAYERED UNDERLAYER AND MAGNETIC STORAGE APPARATUS USING SUCH MAGNETIC RECORDING MEDIUM

BACKGROUND OF THE INVENTION

The present invention relates to magnetic storage apparatus and longitudinal magnetic recording media and more particularly, to a longitudinal magnetic recording medium which is low in media noise and is less susceptible to thermal fluctuation as well as to a magnetic storage apparatus which has a recording density as high as, e.g., 3 giga-bits or more per $inch^2$.

As computers having higher performances are developed, the quantity of information to be treated such as image data has been steadily increased. This also has required a larger capacity of a magnetic disk device as an external storage device. At present, a recording density of several hundreds of mega-bytes per $inch^2$ is realized. As a magnetic head for such a high-density magnetic disk device, there has been recently employed an inductive/magneto-resistive composite head which is separated into recording and reproducing parts so that an inductive head is used as the recording part and a magneto-resistive (MR) head is used as the reproducing part. The magneto-resistive head is higher in reproducing sensitivity than the prior art inductive head, so that, even when the size of recorded bits is much reduced and leakage flux is decreased from the medium, a sufficient reproducing or read output can be obtained. Further, there has been developed a spin-valve type giant magneto-resistive head having a much increased reproducing sensitivity.

A longitudinal magnetic recording medium now commercially available is made up of a magnetic layer of a Co alloy such as CoNiCr, CoCrTa or CoCrPt and a Cr underlayer for control of crystallographic orientation of the magnetic layer. Since the Co alloy magnetic layer has a hexagonal close-packed (hcp) structure having a c axis as an axis of easy magnetization, when the magnetic layer is used for a longitudinal magnetic recording medium, it is desirable to align the c axis to be in-plane. To this end, a technique has been employed such that a Cr underlayer having a body-centered cubic (bcc) structure is first formed on a substrate, and a Co alloy magnetic layer is epitaxially grown on the Cr underlayer so that the c axis is oriented to be in-plane. When CoCrPt alloy is employed for the magnetic layer, a technique has been proposed in which Ti or V is added to a Cr underlayer to increase a lattice spacing and to improve a lattice matching between the underlayer and magnetic layer, thus orienting the c axis more closely to be in-plane (refer to JP-A-63-197018, laid open on Aug. 15, 1988 and JP-A-62-257618 laid open on Nov. 10, 1987).

When a MR head is used as a reproducing head, not only a signal but also noise from the longitudinal recording magnetic medium would be picked up with high sensitivity, for which reason the longitudinal magnetic recording medium is required to be lower in noise than the prior art. The media noise mainly results from a region (magnetization transition region) in which magnetization is disturbed between recording bits. Thus narrowing the region leads to reduction in the media noise. As is well known, this is effectively achieved by making fine magnetic crystal grains or magnetic grains of the magnetic layer and weakening interaction between the particles to thereby make magnetization reversal size small. As has been mentioned above, since an epitaxial relationship is established between the magnetic layer and underlayer, magnetic grains can be made fine by making fine particles of the underlayer. Methods for making the underlayer particles fine are considered to include a method for making the thickness of the underlayer small and a method for adding doping elements to the underlayer.

These methods, however, have problems that it is difficult to keep desired crystallographic orientation and to form a film having an excellent crystalline structure, and further it is hard to establish a good epitaxial relationship between the underlayer and the magnetic layer. There occurs another problem of thermally unstable magnetization involved by excessive fine magnetic grains, which results in that a recorded signal decreases with time. An important factor of fabricating a microstructure desirable for high-density recording is to make fine particles and also to make dispersion of particle sizes small to thereby suppress formation of particles which are too fine to be immune to the influence of thermal fluctuation.

SUMMARY OF THE INVENTION

It is an object of the present invention to provide a magnetic storage apparatus which is high in recording density and reliability and also to provide a longitudinal magnetic recording medium for use in the magnetic storage apparatus, which medium is low in media noise and less susceptible to thermal fluctuation.

According to one aspect of the present invention, a longitudinal magnetic recording medium has a multi-layered underlayer and a magnetic layer formed thereon, wherein the multi-layered underlayer includes a first layer substantially having a body-centered cubic (bcc) structure, a second layer substantially having a hexagonal-closed pack (hcp) structure formed on the first layer, and a third layer substantially having a bcc structure formed on the second layer.

According to another aspect of the present invention, a longitudinal recording magnetic storage apparatus has a magnetic recording disk, a magnetic head associated with the disk, a signal processing circuit connected with the magnetic head, a first driver for rotating the disk and a second driver for actuating the magnetic head for recording/reproducing a signal on the disk, wherein the recording disk comprises a multi-layered underlayer and a magnetic layer formed thereon, the multi-layered underlayer including a first layer substantially having a body-centered cubic (bcc) structure, a second layer substantially having a hexagonal-closed pack (hcp) structure formed on the first layer, and a third layer substantially having a bcc structure formed on the second layer.

Thus, the multi-layered underlayer includes at least one bcc-hcp layer pair having a bcc structure layer and a hcp structure layer formed on the bcc structure layer. The hcp structure layer in the bcc-hcp layer pair is preferably non-magnetic, but may be magnetic to such an extent that the hcp structure should not exert an ill effect on magnetization of the magnetic layer.

Each of the bcc structure layers is preferably (100)-oriented, while each of the hcp structure layers is preferably (11.0)-oriented.

Description will now be made of knowledge obtained by inventors of the present application through their experiments and researches, on which the present invention is based.

The inventors prepared a longitudinal magnetic recording medium by forming a magnetic layer on a multi-layered underlayer of a 3-layer structure in which a layer substantially having an hcp structure is sandwiched by layers substantially having a bcc structure on a substrate.

More specifically, a longitudinal magnetic recording medium, as shown in FIG. 1, is made up of a multi-layered underlayer 12, a magnetic layer 13 and a protective layer 14 sequentially formed on a substrate 11, e.g., by a sputtering process. The multi-layered underlayer 12, as shown in FIG. 2, has a 3-layer structure in which a layer (which will be referred to merely as the hcp layer, hereinafter) 22 having a hexagonal close-packed (hcp) structure is sandwiched by a layer (which will be referred to merely as the bcc layer, hereinafter) 21 having a body-centered cubic (bcc) structure and another bcc layer 23.

It has been experimentally found, when there is employed such a multi-layered underlayer that is made of the bcc layer 21 (100)-oriented, the hcp layer 22 (11.0)-oriented on the bcc layer 21, and the bcc layer 23 (100)-oriented on the hcp layer 22 by an epitaxial growth process, the particle size of the magnetic layer can be made fine. This is considered to result from the fact that, as reported in J. Appl. Phys., Vol. 73, (10), May 15, 1993, the magnetic layer has a so-called bi-crystal structure in which a plurality of hcp particles (11.0)-oriented are grown on a single bcc particle so that their c axes are perpendicular to each other. That is, reduction of the crystal grain size takes place at an interface between the bcc and hcp layers 21 and 22 and also takes place at an interface between the bcc layer 23 and magnetic layer 13.

Further, as shown in FIG. 3, when an additional hcp layer 31 is formed on the bcc layer 23 as the multi-layered underlayer 12 so that the magnetic layer 13 is formed on the hcp layer 31, reduction of the crystal grain size also takes place at an interface between the bcc layer 23 and hcp layer 31. It is generally considered that the larger the size of the bcc grains is, the more easily the grains tend to have a bi-crystal structure, though it also depends on the used film forming process. For this reason, a relatively large grain is divided into finer grains, but it is hard for an originally fine grain to be further divided into excessively fine grains, so that the dispersion of the grain size can be suppressed. Further, since the hcp layer 31 has the same hcp crystalline structure as the magnetic layer 13, the hcp layer 31 also can act to improve the crystalline structure in the initial growth part of the magnetic layer. This enables reduction of deterioration of magnetic properties (such as coercivity, coercivity squareness, etc.) involved by the formation of the thin magnetic layer.

With respect to the material of the multi-layered underlayer, in accordance with the lattice constant of the magnetic layer, the bcc layer is preferably made of one selected from the group consisting of Cr and chromium alloys such as Cr—Ti alloy, Cr—V alloy, Cr—Mo alloy and Cr—Ta alloy. The hcp layer is preferably made of one selected from the group consisting of CoCr alloys such as Co—Cr alloy, Co—Cr—Ta alloy, Co—Cr—Pt alloy and Co—Cr—Pt—Ta alloy.

It is preferable that the thicknesses of the respective layers of the multi-layered underlayer be 50 nm or less in order to prevent increase in the grain size.

The hcp layer of the multi-layered underlayer is desirably substantially non-magnetic. However, even when the hcp layer has weak magnetization, its influence exerted on magnetic properties of the magnetic layer can be suppressed by making the hcp layer thin. For example, when the underlayer has such a 3-layer structure as shown in FIG. 2, reduction in the coercivity of the medium can be prevented by setting a product (Br1×t1) of a thickness t1 and a residual magnetic flux density Br1 of the hcp layer 22 to be not larger than 20% of a product (Br2×t2) of a thickness t2 and a residual magnetic flux density Br2 of the magnetic layer 13, as shown in FIG. 4.

It is preferable that the hcp layer of the multi-layered underlayer is set to have a Cr concentration not smaller than 30 at % and not larger than 40 at % in order to weaken the magnetization of the hcp layer and obtain a good crystalline structure.

Meanwhile, the magnetic layer is required to be made of a material having a large crystal magnetic anisotropy in order to suppress the influence of thermal fluctuation involved by the formation of fine grains. More in detail, it is preferable that the magnetic layer contains Co, Cr and Pt as main elements and its Pt concentration be 10 at % or more.

The substrate should have an excellent surface smoothness. More specifically, an Al—Mg substrate having an NiP layer formed thereon, a glass substrate, an SiO2 substrate, an SiC substrate, a carbon substrate or the like can be used as the substrate.

DESCRIPTION OF THE PREFERRED EMBODIMENTS

The present invention will be detailed in connection with preferred embodiments which follow.

Embodiment 1

Figure 1:
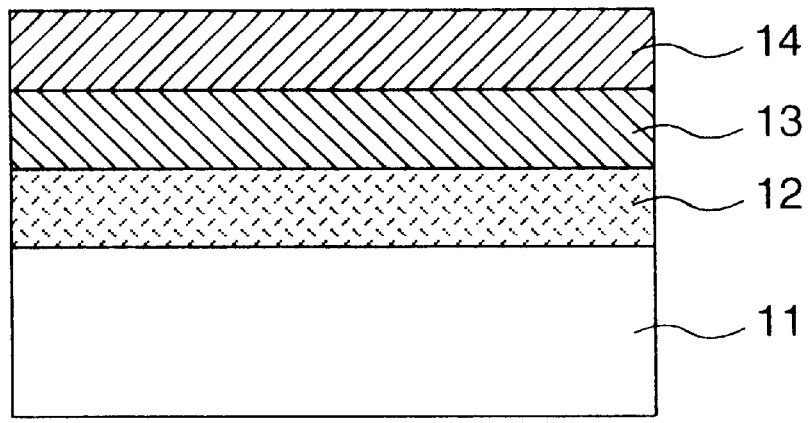
FIG. 1 is a cross-sectional view of a layer structure of a longitudinal recording magnetic medium in accordance with an embodiment of the present invention.
Figure 2:
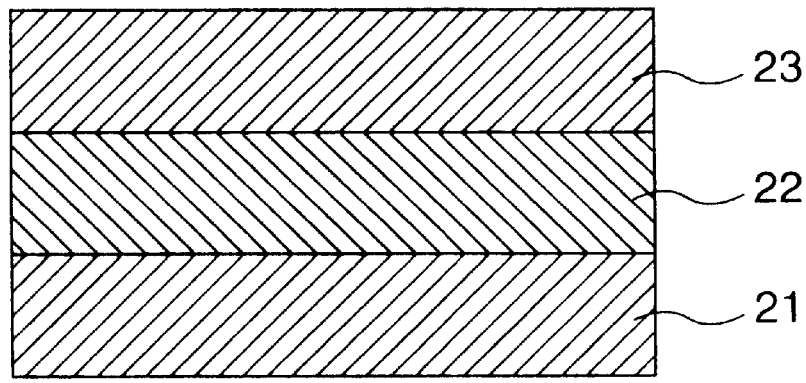
FIG. 2 is a cross-sectional view of a layer structure of a multi-layered underlayer in an embodiment of the present invention.
Figure 3:
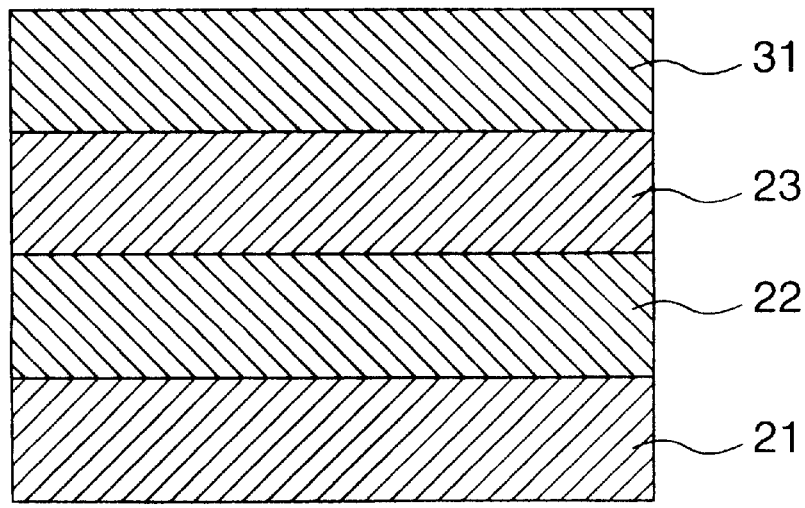
FIG. 3 is a cross-sectional view of a layer structure of another exemplary multi-layered underlayer in an embodiment of the present invention.
Figure 4:
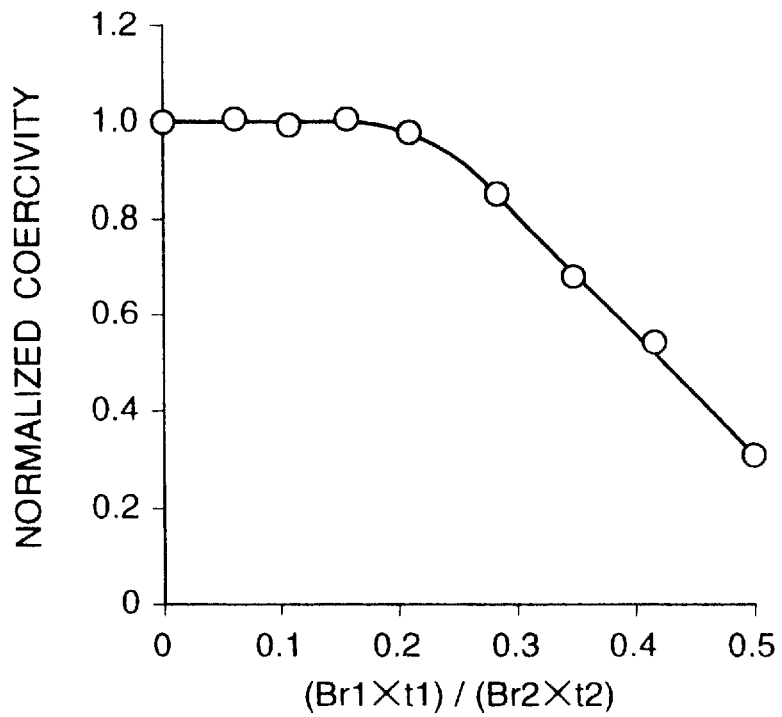
FIG. 4 is a graph showing a relationship between a ratio of (Br1×t1)/(Br2×t2) and normalized coercive force.

An Al—Mg substrate 11 having an outer diameter of 65 mm, an inner diameter of 20 mm and a thickness of 0.4 mm and further having an NiP layer formed on a surface of the substrate, was subjected to a DC magnetron sputtering process to sequentially form thereon a multi-layered underlayer 12, a magnetic layer 13 and protective layer 14 to thereby obtain a longitudinal magnetic recording medium, as shown in FIG. 1. More in detail, the multi-layered underlayer 12 was made up of a 10 nm-thick Cr layer (bcc layer) 21, a 10 nm-thick CoCr alloy layer (hcp layer) 22 and a 10 nm-thick CrTi alloy layer (bcc layer) 23, as shown in FIG. 2. The magnetic layer 13 in FIG. 1 was a 15 nm-thick CoCrPt alloy layer having an hcp structure, and the protective layer 14 was a carbon layer. The above film formation was carried out under conditions that Argon gas partial pressure is 6 mTorr, an input power is 1 kW and a substrate temperature is 300° C.

Figure 5:
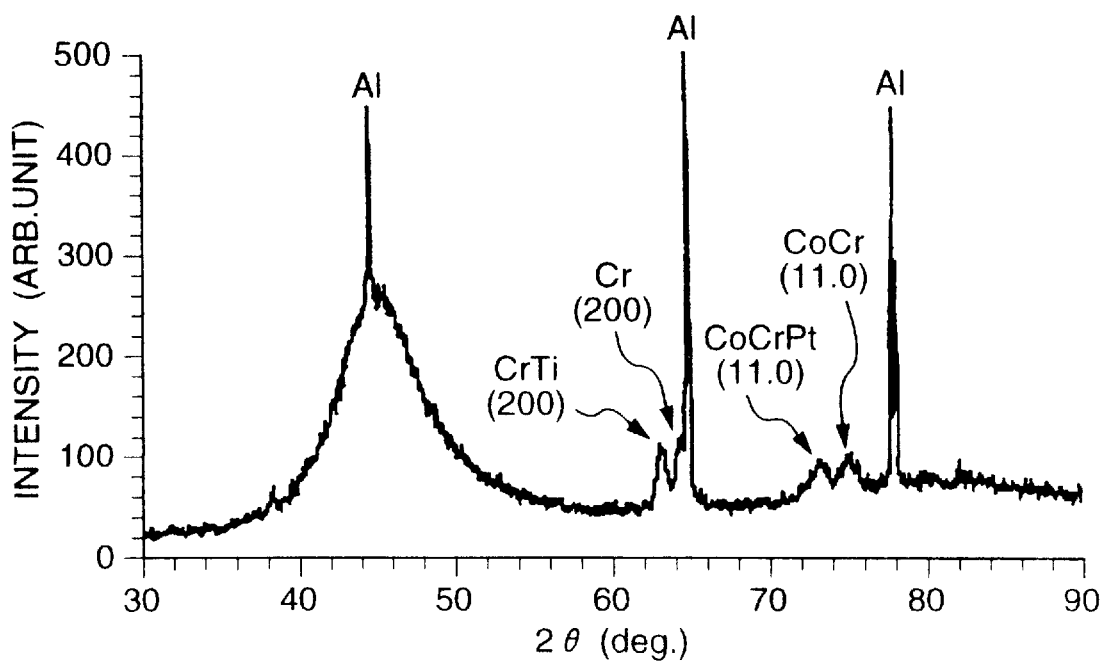
FIG. 5 is a X-ray diffraction pattern of the longitudinal recording magnetic medium of embodiment 1.

The respective layers of the recording medium in accordance with the present embodiment were evaluated with respect to their crystallographic orientation by an X-ray diffraction analysis, which results are shown in FIG. 5. It has been found that the bcc Cr layer 21 is (100)-oriented, the hcp CoCr alloy layer 22 grown on the layer 21 is (11.0)-oriented, the bcc CrTi alloy layer 23 grown on the layer 22 is (100)-oriented, and the hcp CoCrPt magnetic layer 14 grown on the layer 23 is (11.0)-oriented.

When the Cr concentration in the CoCr alloy layer 22 in the underlayer is varied in a range from 25 at % to 45 at %, it has been found that the CoCr alloy layer 22 is magnetized as weakly as about 150 emu/cc at a Cr concentration of 25 at %. In general, when the CoCr alloy is a bulk, the alloy becomes non-magnetic at a Cr concentration of about 25 at % or more. However, when the film forming temperature is increased to about 300° C. to form a CoCr alloy thin film, the alloy film becomes magnetized. This is considered to be because the alloy is separated into a phase (ferromagnetic) with low Cr concentration and a phase (non-magnetic) with high Cr concentration. It has also been found that, when the Cr concentration is set at 45 at % or more, the crystal structure of the CoCr alloy layer cannot have an hcp single phase and thus cannot satisfy an epitaxial relationship with the upper and lower layers.

As a result of evaluating read/write characteristics of the recording medium according to the present embodiment, good read/write characteristics were obtained, in particular, when the Cr concentration is not smaller than 30 at % and not larger than 40 at %. When reading and writing operations were carried out by use of a magneto-resistive head with a linear recording density of 260 kFCI and with a longitudinal magnetic recording medium having the CoCr alloy layer with 35 at % of Cr concentration, the medium had a signal-to-noise ratio of 1.8. In the case of a longitudinal magnetic recording medium using the CoCr alloy layer having a Cr concentration less than 30 at % or higher than 40 at %, a product (Br×t) with the residual magnetic flux density Br becomes large or the crystallographic orientation of the magnetic layer will be insufficient, so that the medium had a low signal-to-noise ratio of 1.3 or less.

It has been obvious from the above examinations that, in order to suppress the magnetization of the underlayer which affects magnetic properties of the magnetic layer and also to realize good epitaxial growth, the Cr concentration of the CoCr alloy layer is required to be set at a level not smaller than 30 at % and not larger than 40 at %.

Embodiment 2

An Al—Mg substrate 11 having an outer diameter of 65 mm, an inner diameter of 20 mm and a thickness of 0.4 mm and further having an NiP layer formed on a surface of the substrate, was subjected to a DC magnetron sputtering process to sequentially form thereon a multi-layered underlayer 12, a magnetic layer 13 and protective layer 14 to thereby obtain a longitudinal recording magnetic medium, as shown in FIG. 1. More in detail, the multi-layered underlayer 12 was made up of a 10 nm-thick Cr layer (bcc layer) 21, a 10 nm-thick CoCr alloy layer (hcp layer) 22, a 10 nm-thick CrTi alloy layer (bcc layer) 23 and a 10 nm-thick CoCr alloy layer (hcp layer) 31, as shown in FIG. 2. The magnetic layer 13 in FIG. 1 was a 15 nm-thick CoCrPt alloy layer having an hcp structure, and the protective layer 14 was a carbon layer. The above film formation conditions were the same as in the embodiment 1.

Figure 6:
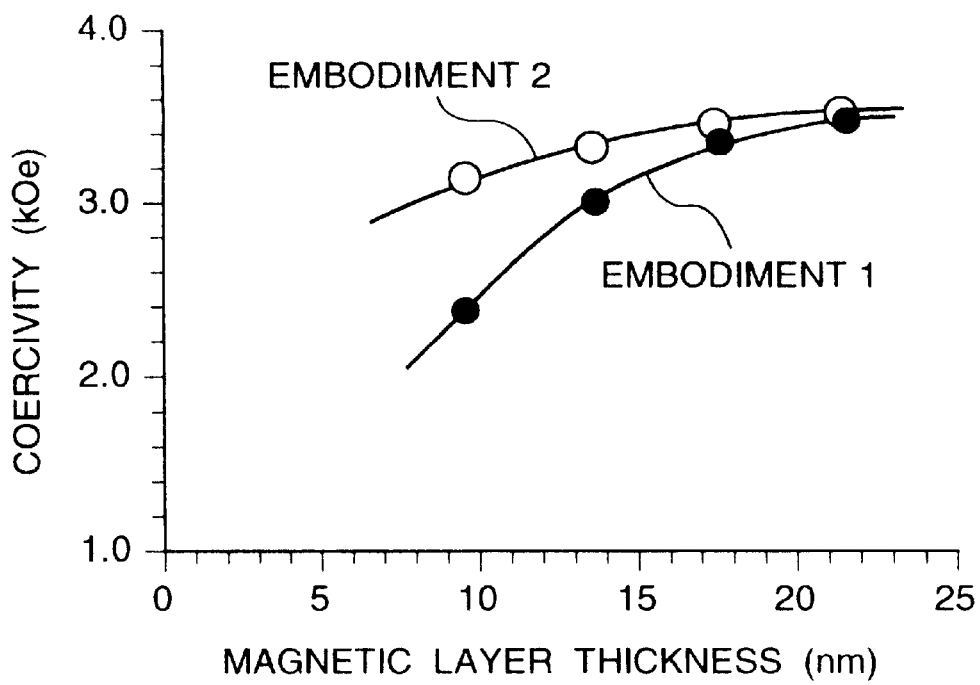
FIG. 6 is a graph showing a relationship of a thickness of a magnetic layer and a coercivity of longitudinal magnetic recording media.

FIG. 6 shows a relationship between the thickness of the magnetic layer in the recording medium of the present embodiment and coercivity Hc measured with a magnetic field applied in a relative running direction of a magnetic head to the medium in a write mode, together with measurement results of the longitudinal magnetic recording medium of the embodiment 1. In the case of the longitudinal magnetic recording medium of embodiment 2, it is seen that, when the thickness of the magnetic layer is made small, reduction in the coercive force is smaller than that of the longitudinal magnetic recording medium of embodiment 1. This is considered to be because the uppermost layer of the multi-layered underlayer has the same hcp structure as the magnetic layer, thus improving the crystalline structure of the initial growth part of the magnetic layer. In this way, it has become clear that, when it is desired to make the magnetic layer thin, it is effective for the uppermost layer of the multi-layered underlayer to have an hcp structure. It has also been found that, when a Pt concentration of the magnetic layer 13 is high, a similar result can be obtained by adding Pt, Ta or the like to the CoCr alloy layer 31 in the multi-layered underlayer to improve a lattice matching between the magnetic layer and underlayer.

Embodiment 3

Figure 7A:
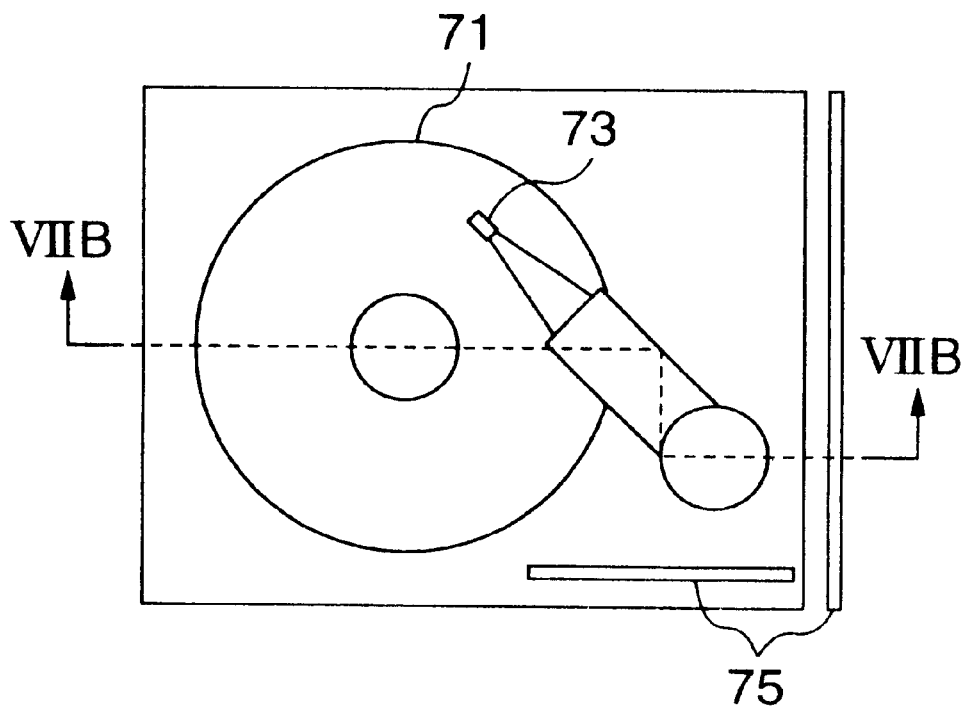
FIGS. 7a and 7b are a plan view of a magnetic storage apparatus in accordance with an embodiment of the present invention and a cross-sectional view taken along line VIIB—VIIB therein, respectively.
Figure 7B:
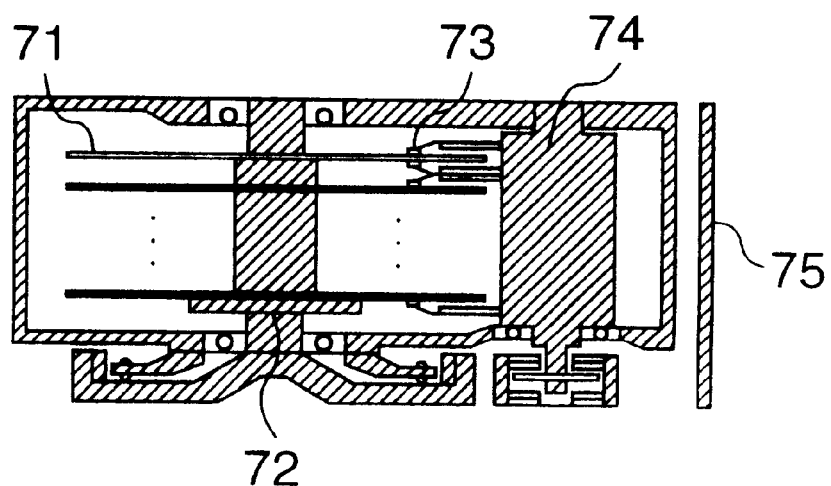

A plan view of a magnetic storage apparatus in accordance with an embodiment of the present invention as well as a vertical cross-sectional view of the apparatus are shown in FIGS. 7a and 7b. More in detail, FIG. 7b is a cross-sectional view taken along line VIIB—VIIB in FIG. 7a. The magnetic storage apparatus includes a longitudinal magnetic recording medium 71, a driver 72 for rotation-driving the medium, a magnetic head 73, a driver 74 for driving the magnetic head, and a read/write signal processing circuit 75.

Figure 8:
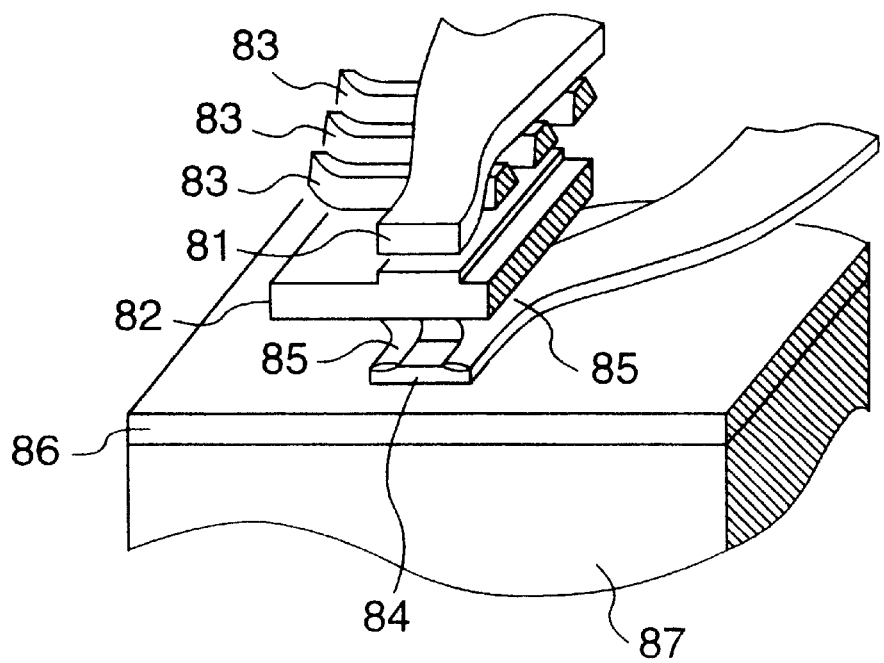
FIG. 8 is a perspective view of a sectional structure of a magnetic head of a magnetic storage apparatus according to an embodiment of the present invention.

Shown in FIG. 8 is a structure of the magnetic head used in the magnetic storage apparatus. This magnetic head is of a composite type which is a combination of a reading inductive head formed on a magnetic head slider base 87 and a reproducing magneto-resistive head. The recording inductive head section is of a thin film type which has a pair of recording magnetic poles 81 and 82 and a coil 83 intersected therewith. A layer gap between the recording magnetic poles was set to be 0.3 μm. The magnetic pole 82 also functions as a magnetically shielding layer. More in detail, the magnetic pole 82 forms a pair with a magnetic shield layer 86, both of which have a thickness of 1 μm and function also to magnetically shield the reproducing head. A distance between the shield layers is 0.25 μm (FIG. 8 being not to scale for clarification of the structure). The reproducing magneto-resistive head section has a magneto-resistive sensor 84 and conductor layers 85 as electrodes.

Figure 9:
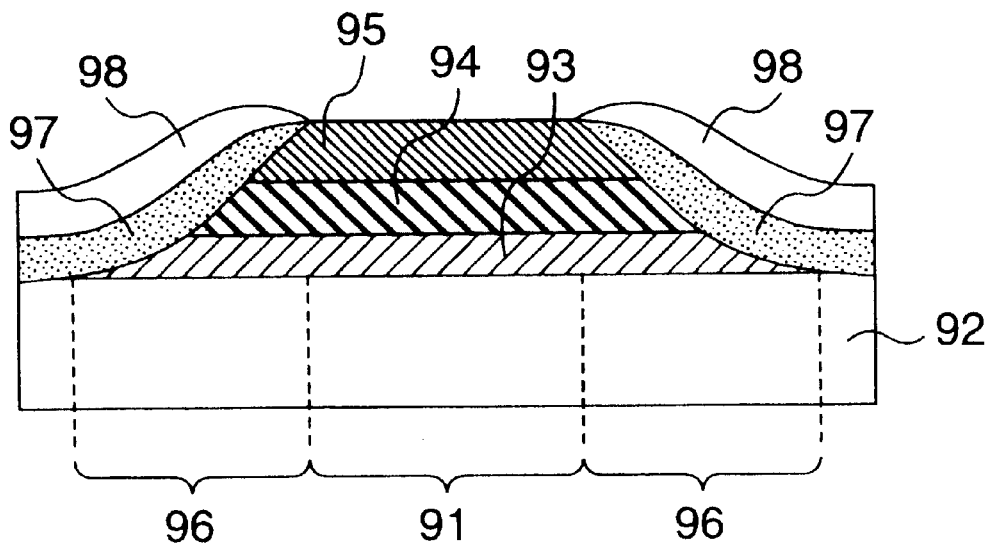
FIG. 9 is a vertical cross-sectional view of a magneto-resistive sensor of a magnetic head usable in the magnetic storage apparatus shown in FIG. 8.

FIG. 9 shows a vertical cross-sectional view of a structure of the magneto-resistive sensor. A signal detection region 91 of the magneto-resistive sensor includes a transversal biasing layer 93, a separating layer 94 and a magneto-resistive ferromagnetic layer 95 sequentially formed in this order on a gap layer 92 of Al oxide. The magneto-resistive ferromagnetic layer 95 was made of NiFe alloy and 20 nm thick. The transversal biasing layer 93 was made of NiFeNb and 25 nm thick. However, the transversal biasing layer 93 may be made of any alloy, so long as the alloy is of a ferromagnetic type which is relatively high in electric resistance and good in soft magnetic properties. The transversal biasing layer 93 is magnetized by a magnetic field induced by a sense current flowing through the magneto-resistive ferromagnetic layer 95 in a film in-plane direction (transversal direction) perpendicular to the current to apply a transversal biasing magnetic field to the magneto-resistive ferromagnetic layer 95. Thus, this forms a magnetic sensor which can provide a linear reproduction output with respect to a leakage magnetic field from the medium. The separating layer 94 for preventing branching of the sense current from the magneto-resistive ferromagnetic layer 95 was made of Ta that is relatively high in electric resistance and 5 nm thick. The signal detection region 91 has tapered regions 96 provided at its both ends. The tapered regions 96 include permanent magnet layers 97 for converting the magneto-resistive ferromagnetic layer 95 to a single magnetic domain and a pair of electrodes 98 formed on the permanent magnet layer 97 for extracting a reproduced signal thereon. Since the permanent magnet layer 97 is required to be high in coercivity and not to be easily changed in magnetization direction, for which reason the permanent magnet layer 97 is made of alloy such as CoCr or CoCrPt. The longitudinal magnetic recording medium 71 (see FIG. 7) employed was such as described in embodiment 1 and had a coercivity Hc of 3.2 kOe.

When read/write characteristics were evaluated by use of the magnetic recording system of the present embodiment under conditions of a head flying height of 30 nm, a linear recording density of 260 kFCI and a track density of 13 kTPI, a signal-to-noise ratio of 1.8 were obtained. Namely, a sufficiently high level read output was obtained with such a large signal-to-noise ratio. Further, when an input signal of the magnetic head was subjected to an 8/9 coding operation, the recording/reproducing operation was possible with a recording density of 3 Giga-bits per inch$^2$. In addition, after 50,000 cycles of head seek test from inner circumference to outer one, the number of bit errors was 10 bits or less per surface and a mean time interval between failures was 300,000 hours.

Embodiment 4

Figure 10:
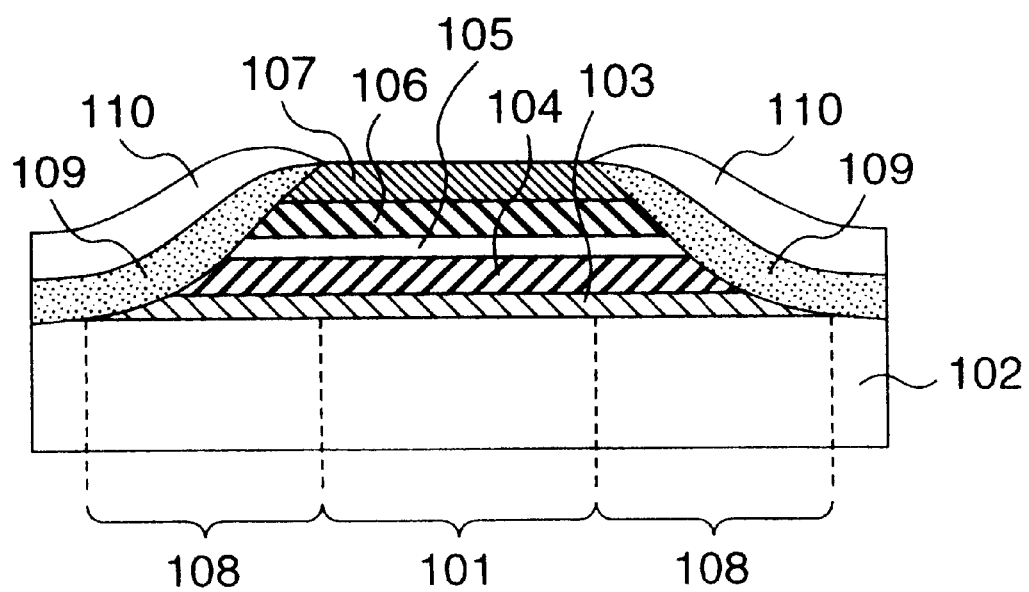
FIG. 10 is a cross-sectional view of a spin-valve type magneto-resistive sensor of a magnetic head usable in the magnetic storage apparatus shown in FIG. 8.

In a magnetic storage apparatus having structures similar to those shown in FIGS. 7a, 7b and 8 in embodiment 3, it is preferable that the magneto-resistive sensor 84 be of such a spin-valve type as shown in FIG. 10, because it provides a larger output. A signal detection region 101 of the magneto-resistive sensor has such a structure that a 3 nm-thick Ta buffer layer 103, a 7 nm-thick first magnetic layer 104, a 1.5 nm-thick Cu intermediate layer 105, a 3 nm-thick second magnetic layer 106 and 10 nm-thick, Fe-20 at % Mn anti-ferromagnetic alloy layer 107 are sequentially formed in this order on a gap layer 102 made of Al oxide. The first magnetic layer 104 was made of a Ni-20 at % Fe alloy and the second magnetic layer 106 was made of Co. Exchange field from the anti-ferromagnetic alloy layer 107 causes the magnetization of the second magnetic layer 106 to be fixed in one direction. The magnetization direction of the first magnetic layer 104 adjacent to the second magnetic layer 106 via the non-magnetic intermediate layer 105, on the other hand, is varied by a leakage magnetic field from the longitudinal magnetic recording medium. Relative change in the magnetization direction between the two magnetic layers causes a change in the total resistance of the 3 layers. This phenomenon is known as spin-valve effect. In the present embodiment, the magneto-resistive sensor utilizes the spin-valve effect. Tapered regions 108 made up of a permanent magnet layer 109 and a pair of electrodes 110 are similar to those in the magneto-resistive sensor explained in connection with the embodiment 2. The longitudinal magnetic recording medium 71 (see FIG. 7) employed was such as described in embodiment 2 and had a coercivity Hc of 3.2 kOe.

When recording/reproducing characteristics were evaluated by use of the magnetic storage apparatus of the present embodiment under conditions of a head flying height of 30 nm, a linear recording density of 260 kFCI and a track density of 13 kTPI, a signal-to-noise ratio of 2.0 was obtained. Namely, a sufficiently high level read output was obtained with such a large signal-to-noise ratio. Further, when an input signal to the magnetic head was subjected to an 8/9 coding operation, the recording/reproducing operation was possible at a recording density of 3 Giga-bits per inch$^2$ in a temperature range of 10 to 50° C. In addition, after 50,000 cycles of head seek test from inner circumference to outer one, the number of bit errors was 10 bits or less per surface and a mean time interval between failures was 300,000 hours.

In accordance with the aforementioned embodiments, since magnetic grains can be made fine and dispersion of the particles can be made small, a signal-to-noise ratio can be made high. As a result, when a high-sensitivity magneto-resistive head is used, there can be provided a small-size, large-capacity magnetic storage apparatus which has a recording density of 3 Gigabits or more per inch$^2$, a high signal-to-noise ratio, a low error rate, and a mean time interval between failures of 300,000 hours or more.

We claim:

1. A longitudinal magnetic recording medium comprising a multi-layered underlayer and a magnetic layer formed thereon and substantially having a hexagonal-close packed (hcp) structure, wherein said multi-layered underlayer includes a first layer substantially having a body-centered cubic (bcc) structure, a second layer substantially having a hcp structure formed on said first layer to form a bcc-hcp layer pair with said first layer, and a third layer substantially having a bcc structure formed on said second layer, and wherein an uppermost layer in said multi-layered underlayer on which said magnetic layer is formed is in one of a bcc structure and a hcp structure such that said uppermost layer forms another bcc-hcp layer pair with one of said magnetic layer and a layer underlying said uppermost layer in said multi-layered underlayer.

2. A longitudinal magnetic recording medium according to claim 1, wherein said first and third layers are (100)-oriented and said second layer is (11.0)-oriented.

3. A longitudinal magnetic recording medium according to claim 1, wherein each of said first and third layers is made of chromium or a chromium alloy and said second layer is made of a cobalt-chromium alloy.

4. A longitudinal magnetic recording medium according to claim 3, wherein said second layer has a chromium concentration in a range from 30 at % to 40 at %.

5. A longitudinal magnetic recording medium according to claim 3, wherein said chromium alloy is an alloy selected from the group consisting of a Cr alloy, a Cr—Ti alloy, a Cr—V alloy, a Cr—Mo alloy and a Cr—Ta alloy, and said cobalt-chromium alloy is an alloy selected from the group consisting of a Co—Cr alloy, a Co—Cr—Ta alloy, a Co—Cr—Pt alloy and a Co—Cr—Pt—Ta alloy.

6. A longitudinal magnetic recording medium according to claim 1, wherein said second layer has a residual magnetic flux density Br1 and a thickness of t1, with respect to a residual magnetic flux density Br2 and a thickness t2 of said magnetic layer, satisfying $$Br1 \times t1 \leq 0.2 \times Br2 \times t2.$$

7. A longitudinal magnetic recording medium according to claim 1, wherein said each of said first to third layers has a substantial thickness not larger than 50 nm.

8. A longitudinal magnetic recording medium according to claim 1, wherein said magnetic layer is mainly made of cobalt, chromium and platinum, wherein a platinum density is substantially not smaller than 10 at %.

9. A longitudinal magnetic recording medium according to claim 1, wherein said multi-layered underlayer includes as said uppermost layer a fourth layer substantially having a hcp structure formed on said third layer to form said another bcc-hcp layer pair therewith.

10. A longitudinal magnetic recording medium according to claim 9, wherein said first and third layers are (100)-oriented and said second and fourth layers are (11.0)-oriented.

11. A longitudinal magnetic recording medium according to claim 9, wherein each of said first and third layers is made of chromium or a chromium alloy and each of said second and fourth layers is made of a cobalt-chromium alloy.

12. A longitudinal magnetic recording medium according to claim 11, wherein each of said second and fourth layers has a chromium concentration in a range from 30 at % to 40 at %.

13. A longitudinal magnetic recording medium according to claim 11, wherein said chromium alloy is an alloy selected from the group consisting of a Cr alloy, a Cr—Ti alloy, a Cr—V alloy, a Cr—Mo alloy and a Cr—Ta alloy, and said cobalt-chromium alloy is an alloy selected from the group consisting of a Co—Cr alloy, a Co—Cr—Ta alloy, a Co—Cr—Pt alloy and a Co—Cr—Pt—Ta alloy.

14. A longitudinal magnetic recording medium according to claim 9, wherein each of said first to fourth layers has a substantial thickness not larger than 50 nm.

15. A longitudinal magnetic recording medium according to claim 9, wherein said magnetic layer is mainly made of cobalt, chromium and platinum, wherein a platinum density is substantially not smaller than 10 at %.

16. A longitudinal magnetic recording medium according to claim 1, wherein said third layer is the uppermost layer in said multi-layered underlayer, with said magnetic layer being formed on said third layer to form said another bcc-hcp layer pair therewith.

17. A longitudinal magnetic recording medium comprising a multi-layered underlayer formed on a substrate and a magnetic layer formed on said underlayer and substantially having a hexagonal-close packed (hcp) structure, wherein said multi-layered underlayer includes:
a first layer substantially having a body-centered cubic (bcc) structure formed on said substrate;
a second layer substantially having a hcp structure formed on said first layer to form a bcc-hcp layer pair with said first layer; and
a third layer substantially having a bcc structure formed on said second layer, with said magnetic layer being formed on said third layer to form another bcc-hcp layer pair therewith.

18. A longitudinal magnetic recording medium according to claim 17, wherein said substrate is made of a material selected from a group consisting of an Al—Mg alloy, glass, SiO$_2$, SiC and carbon.

19. A longitudinal magnetic recording medium comprising a multi-layered underlayer formed on a substrate and a magnetic layer formed on said underlayer and substantially having a hexagonal-close packed (hcp) structure, wherein said multi-layered underlayer includes:
a first layer substantially having a body-centered cubic (bcc) structure formed on said substrate;
a second layer substantially having a hcp structure formed on said first layer to form a bcc-hcp layer pair with said first layer;
a third layer substantially having a bcc structure formed on said second layer; and
a fourth layer substantially having a hcp structure formed on said third layer to form another bcc-hcp layer paid with said third layer therewith, with said magnetic layer being formed on said fourth layer.

20. A longitudinal magnetic recording medium according to claim 19, wherein said substrate is made of a material selected from a group consisting of an Al—Mg alloy, glass, SiO$_2$, SiC and carbon.

21. A longitudinal magnetic recording storage apparatus comprising a magnetic recording disk, a magnetic head associated with said disk, a signal processing circuit connected with said magnetic head, a first driver for rotating said disk and a second driver for actuating the magnetic head for recording/reproducing a signal on said disk, wherein:
said recording disk comprises a multi-layered underlayer and a magnetic layer formed thereon and substantially having a hexagonal-close packed (hcp) structure, the multi-layer underlayer including
a first layer substantially having a body-centered cubic (bcc) structure,
a second layer substantially having a hcp structure formed on said first layer to form a bcc-hcp layer pair with said first layer, and
a third layer substantially having a bcc structure formed on said second layer, and wherein
an uppermost layer in said multi-layered underlayer on which said magnetic layer is formed is in one of a bcc structure and a hcp structure such that said uppermost layer forms another bcc-hcp layer pair with one of said magnetic layer and a layer underlying said uppermost layer in said multi-layered underlayer.

22. A longitudinal magnetic recording storage apparatus according to claim 21, wherein said magnetic head is an inductive/magneto-resistive composite head.

23. A longitudinal magnetic recording storage apparatus according to claim 21, wherein said multi-layered underlayer further includes as said uppermost layer a fourth layer substantially having a hcp structure formed on said third layer to form said another bcc-hcp layer pair.

24. A longitudinal magnetic recording storage apparatus according to claim 23, wherein said magnetic head is an inductive/magneto-resistive head.

25. A longitudinal magnetic recording storage apparatus according to claim 21, wherein said third layer is the uppermost layer in said multi-layered underlayer, with said magnetic layer being formed on said third layer to form said another bcc-hcp layer pair therewith.

26. A longitudinal magnetic recording medium comprising a magnetic layer formed on a substrate through a multi-layered underlayer and substantially a hexagonal-close packed (hcp) structure, wherein said multi-layered underlayer includes at least three layers in which a layer substantially having a hcp structure is sandwiched by layers substantially having a body-centered cubic (bcc) structure to form a bcc-hcp layer pair with one of the bcc structure layers underlying the hcp structure layer, and wherein a layer in said multi-layered underlayer adjacent to and in contact to said magnetic layer has substantially a hexagonal close-packed structure to form another bcc-hcp layer pair.

27. A longitudinal magnetic recording medium according to claim 26, wherein said multi-layered underlayer includes a single layer of a substantially hcp structure, a product of a thickness t1 and a residual magnetic flux density Br1 of said layer of the substantially hcp structure is not larger than 20% of a product of a thickness t2 and a residual magnetic flux density Br2 of said magnetic layer.

28. A longitudinal magnetic recording medium according to claim 26, wherein each of the layers in said multi-layered underlayer substantially having the hexagonal close-packed structure contains Co and Cr as its main components and a Cr concentration is not smaller than 30 at % and not larger than 40 at %.

29. A magnetic storage apparatus comprising a longitudinal recording magnetic medium, a driver for driving said medium, a magnetic head including recording and reproducing head sections, a second driver for driving said magnetic head to read/write a signal on said longitudinal recording magnetic medium, and a read/write signal processing circuit for recording an input signal to said magnetic head and reproducing an output signal from the magnetic head, wherein:

said reproducing head section of said magnetic head comprises a magneto-resistive sensor, said sensor including a plurality of electrically conductive magnetic layers whose resistances are largely changed by relative change in their magnetization directions by an external magnetic field and also including an electrically conductive non-magnetic layer disposed between said conductive magnetic layers; and said magnetic recording medium has a substrate, a multi-layered underlayer formed on said substrate and a magnetic layer formed on said multi-layered underlayer and substantially having a hexagonal close-packed (hcp) structure, said multi-layered underlayer including at least three layers in which a layer substantially having a hcp structure is sandwiched by layers substantially having a body-centered cubic structure to form a bcc-hcp layer pair with one of the bcc structure layers underlying the hcp structure layer, and wherein a layer of said multi-layered underlayer adjacent to and in contact to said magnetic layer has a substantially hexagonal close-packed structure to form another bcc-hcp layer pair.

30. A magnetic storage apparatus according to claim 29, wherein one layer substantially having a hexagonal close-packed (hcp) structure is provided in said multi-layered underlayer, and a product of a thickness t1 and a residual magnetic flux density Br1 of said layer substantially having the hcp structure is not larger than 20% of a product of a thickness t2 and a residual magnetic flux density Br2 of said magnetic layer.

31. A magnetic recording apparatus according to claim 29, wherein each of said layers in said multi-layered underlayer substantially having a hexagonal close-packed structure contains Co and Cr as main elements, and a Cr concentration thereof is not smaller than 30 at % and not larger than 40 at %.

* * * * *